United States Patent

[11] 3,611,946

[72] Inventors Donald G. Heximer
 N. Tonawanda;
 Walter D. Sullivan, Snyder, both of N.Y.
[21] Appl. No. 14,443
[22] Filed Feb. 26, 1970
[45] Patented Oct. 12, 1971
[73] Assignee Columbus McKinnon Corporation
 Tonawanda, N.Y.

[54] ELEVATOR TRANSFER MECHANISM
 16 Claims, 12 Drawing Figs.
[52] U.S. Cl. ................................................ 104/127,
 104/129, 104/96, 104/98, 187/73
[51] Int. Cl. ...................................................... B66b 17/18,
 B66b 17/20
[50] Field of Search ........................................... 187/73, 75,
 77; 214/16.11; 104/127, 128, 129, 96–103

[56] References Cited
UNITED STATES PATENTS
2,642,814 6/1953 Anjeskey ..................... 104/98
2,691,448 10/1954 Lontz ........................... 214/16.11

*Primary Examiner*—Arthur L. La Point
*Assistant Examiner*—D. W. Keen
*Attorney*—Bean & Bean ABSTRACT: A mechanism for transferring a trolley between a transfer conveyor rail, which is carried for vertical movement by an elevator car, and stationary overhead conveyor rails arranged at the floor levels to be served by the elevator car. The transfer rail, together with a powered device operable to transfer the trolley between the rails, is supported on a platform, which is in turn loosely suspended as a unit from the elevator car. Cam leveler devices are carried on the platform for the purpose of automatically adjusting the unit relative to the elevator car, when the latter is stationary adjacent a floor level to be served, in order to accurately align the transfer rail with the stationary rails at such floor level.

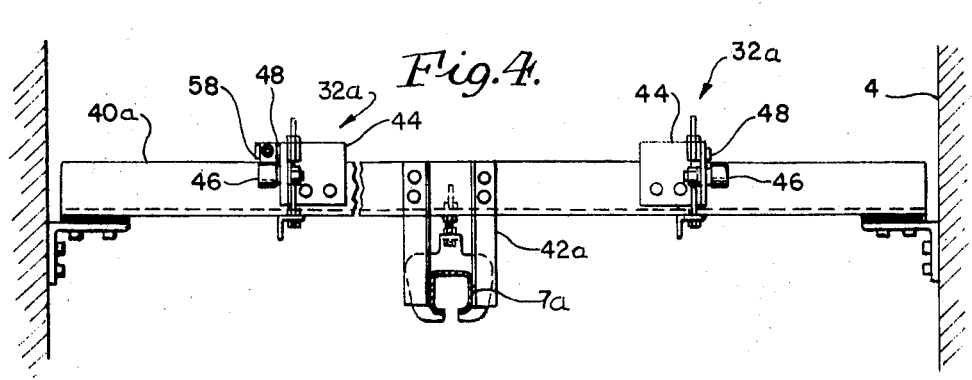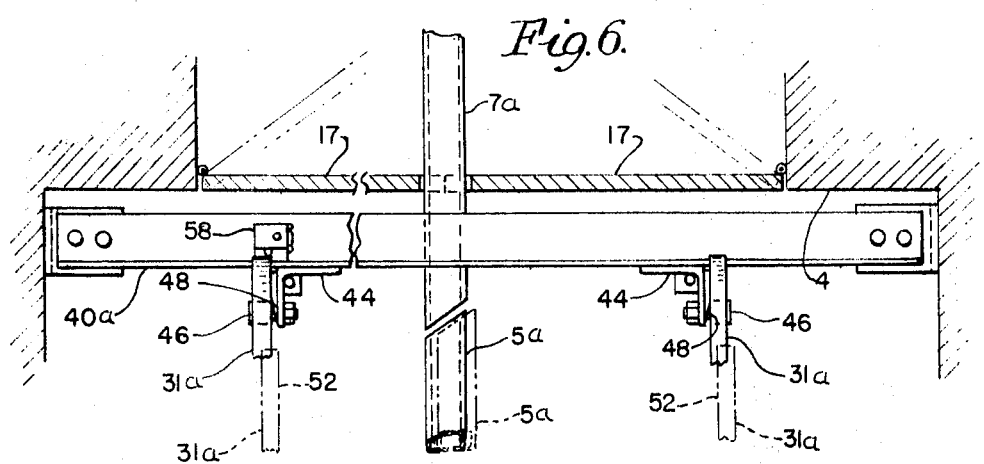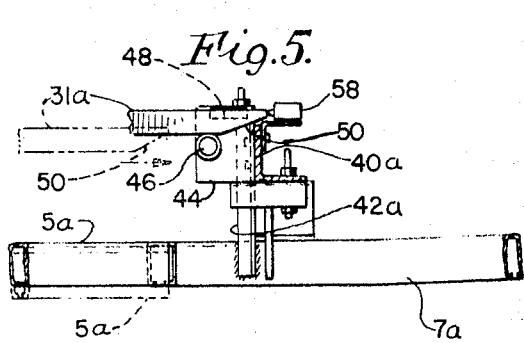

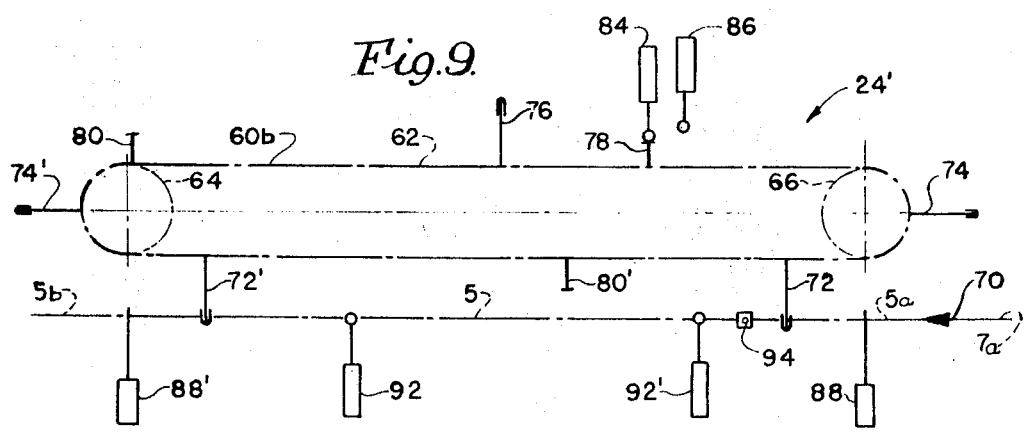
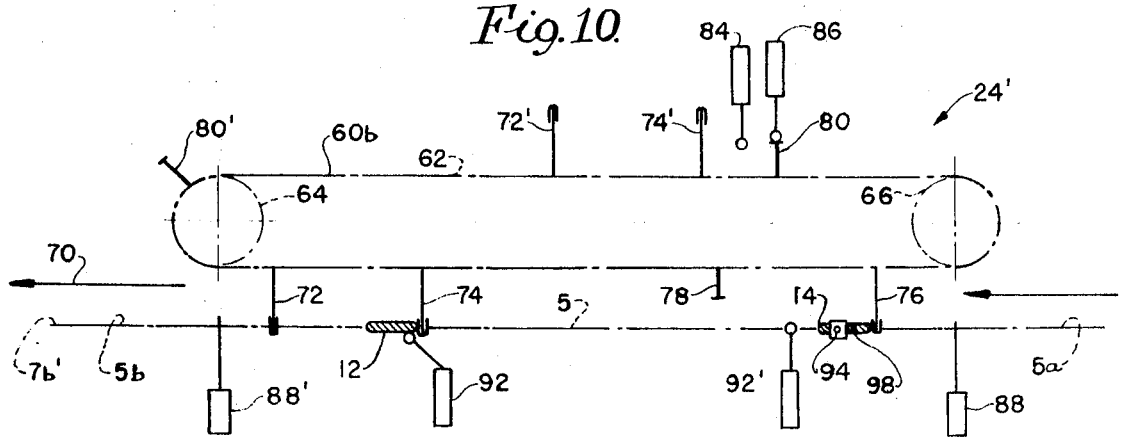
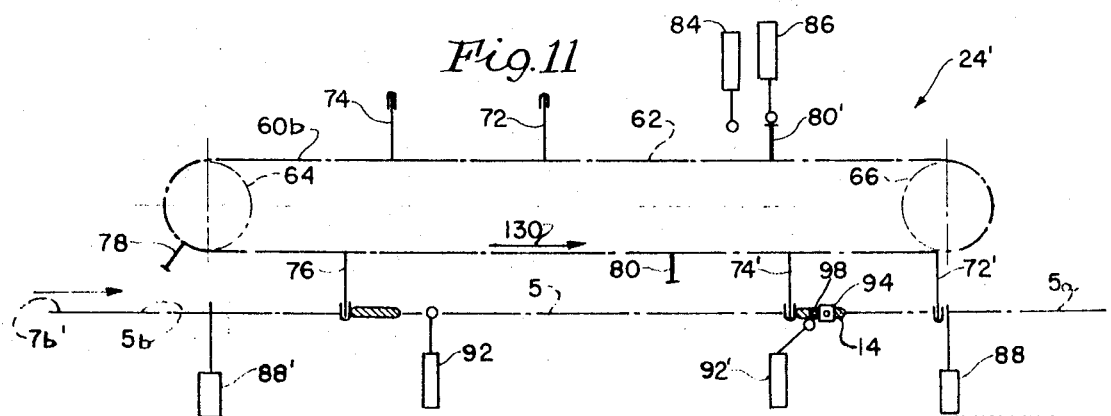

ELEVATOR TRANSFER MECHANISM

BACKGROUND OF THE INVENTION

Automatic cart transfer transportation systems have been devised, which will move supply carts by overhead conveyor rails from a central storage, processing or dispatch center to receiving stations disposed on the same or other floor levels of a building. The carts are conventionally provided with supporting wheels to enable the carts to be selectively disconnected from the conveyor at the central or receiving stations and moved independently of the conveyor system. The carts maybe moved throughout all or part of the conveyor system by power, by hand or by gravity, as desired.

Conventionally, carts are carried from point to point along the overhead rails of the conveyor by roller supported trolleys or carriages, which may be provided with suitable encoders of the type described in U.S. Pat. Nos. 3,074,353; 3,140,669; 3,171,362 and 3,182,140, which are adapted to preselect the route and destination of the trolley and thus the carts.

A decided drawback in present-day systems is the inability to properly transfer the trolleys between a transfer rail, which is carried between floor levels by an elevator car, and the stationary overhead rails of the conveyor, which are arranged at each of the floor levels to be serviced by the system. In this respect, presently available elevator leveling equipment and guide devices cannot guarantee accurate vertical and/or horizontal alignment of the transfer rail relative to the mating ends of the stationary rails. As a result of misalignment between the transfer and stationary rails, the transfer of trolleys is ofttimes prevented and at best the trolleys are subjected to jolting or jarring during transfer. Such jolting or jarring greatly increases wear of the system parts, produces loud noises which are unacceptable in many installations, such as hospitals, and may cause articles carried by the cart to spill, break or be dislodged from the cart.

SUMMARY OF THE INVENTION

The present invention is directed towards a mechanism for use in transferring a trolley between relatively movable rail sections of an overhead conveyor system.

The invention includes a transfer unit including a platform, which is freely suspended from an elevator car and serves as a support for a transfer rail, a powered device adapted to transfer the trolley between the transfer rail and stationary rails disposed at the several floor levels to be serviced by the elevator, and cam leveler devices, which serve to move the platform relative to the elevator car when the latter is stationary adjacent a floor level in order to accurately align mating ends of the transfer and stationary rails.

DRAWINGS

The nature and mode of operation of the present invention will be more fully described in the following detailed description taken with the accompanying drawings, wherein:

FIG. 4 is a sectional view taken generally along the line 4—4 in FIG. 2;

FIG. 5 is a sectional view taken generally along the line 5—5 in FIG. 3;

FIG. 6 is a sectional view taken generally along the line 6—6 in FIG. 2;

Figure 12:
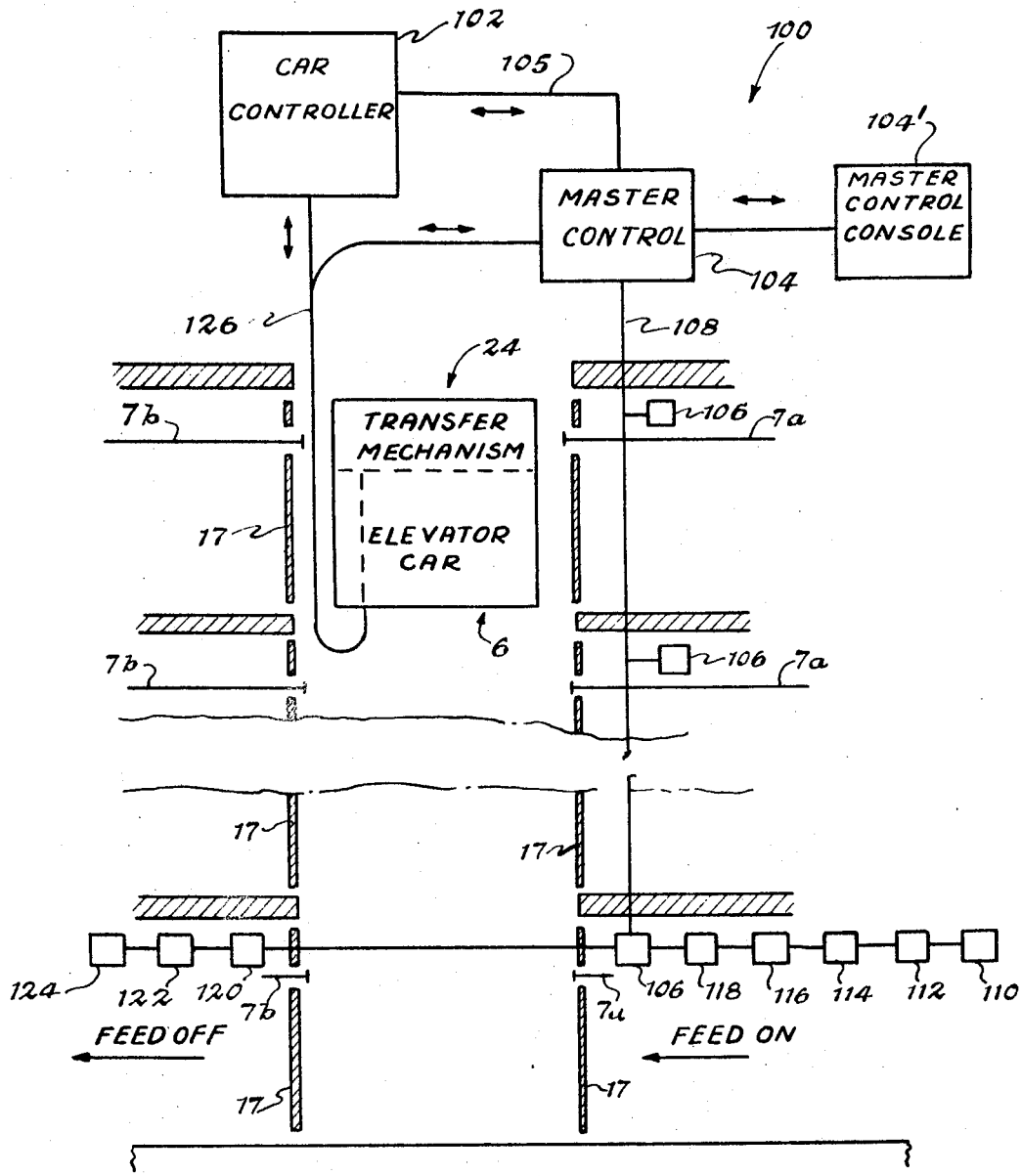

FIGS. 9, 10, and 11 are diagrammatic views illustrating the sequence of operation of a modified embodiment of the elevator transfer mechanism; and FIG. 12 is a diagrammatic view illustrating the transportation system controls in association with a conventional elevator car movement controller.

DETAILED DESCRIPTION

Figure 1:
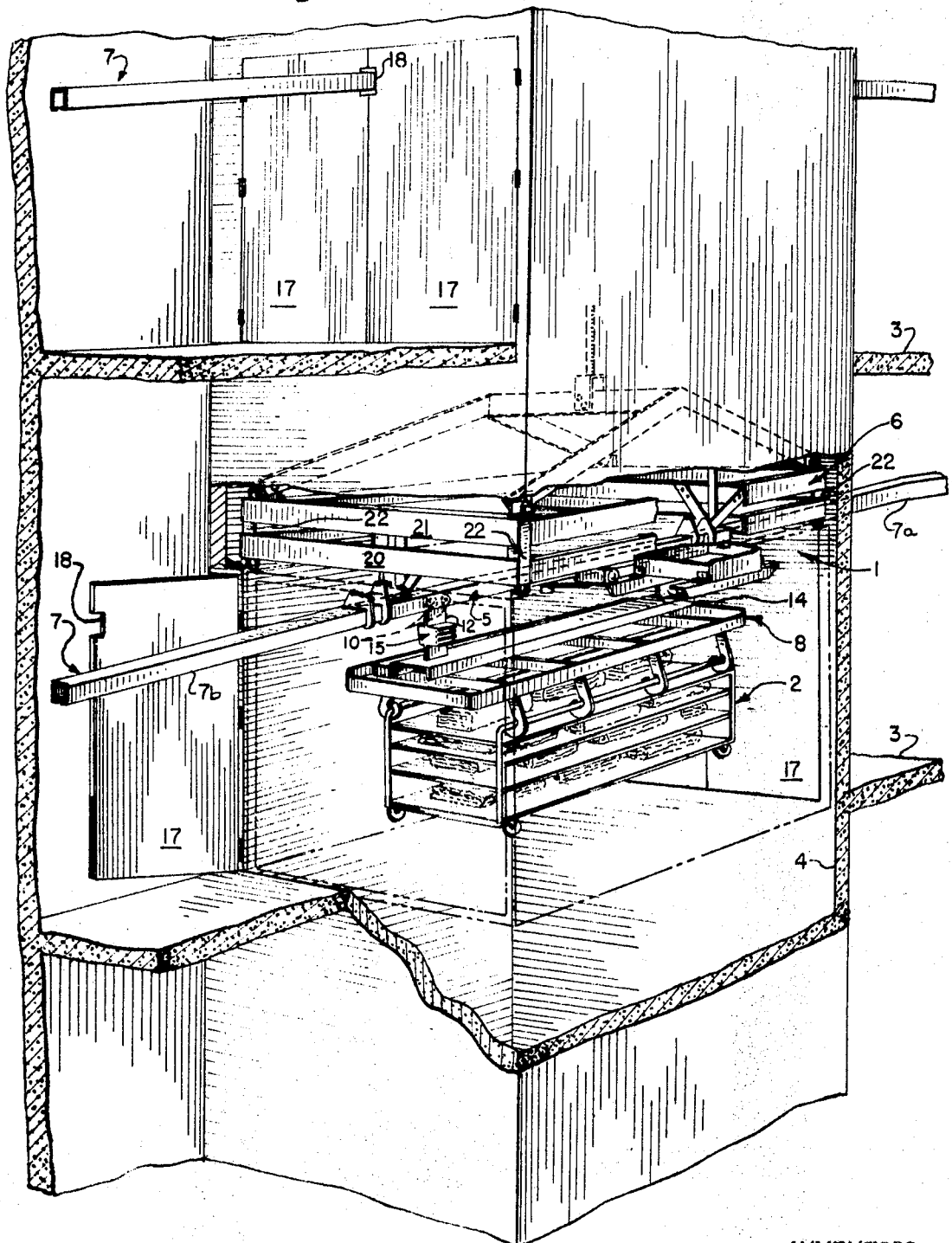
FIG. 1 is a perspective view illustrating a portion of an automatic cart transportation system in which the elevator transfer mechanism of the present invention has utility.

Now referring to FIG. 1, it will be understood that the transfer mechanism according to the present invention, which is generally designated as 1, is particularly adapted for use in an automatic cart transportation system of the type wherein carts 2 are moved by an overhead conveyor system between a central storage, processing or dispatch center, not shown and receiving stations, also not shown, which are disposed on the same or other floor levels 3 of a building connected by elevator shaft 4.

Conventional systems include a transfer conveyor rail 5, which is fixedly carried for vertical movement between floor levels 3 by an elevator car 6, and stationary conveyor rails 7, which are fixedly positioned at each floor level to be serviced by the elevator car. Article transporting carts 2 are releasably supported by a trolley 8, which is in turn movably suspended from rails 5 and 7 by rollers 10 mounted on front and rear trolley standards 12 and 14.

Normally, trolleys 8 are gravity fed onto transfer rail 5 by slightly inclined input stationary rails 7a and gravity discharged from the transfer rail by slightly inclined output stationary rails 7b. However, powered devices, not shown, may be employed to control movement of the trolley relative to the elevator car, particularly in cases where the trolley is fed from and discharged onto a single stationary rail at any given floor level, as will hereinafter be described.

In fully automatic conveyor systems trolleys 8 are provided with encoders, generally indicated at 15, which may be manually preset so as to chart or preselect the course of travel of each cart through the conveyor system. Suitable readout devices are arranged throughout the system for the purpose of reading or sensing the settings of encoders 15. The sensors serve both to control diverting of the trolley between various branches of the conveyor on each floor level and to signal the transportation system control arrangement hereinafter discussed with reference to FIG. 12 for the purpose of controlling ingress or egress of the trolleys from the elevator car. Encoders and sensors may, if desired, be of the type described in any of U.S. Pat. Nos. 3,074,353; 3,140,669; 3,171,362 or 3,182,840.

Preferably, the elevator shaft is normally sealed at each floor level by hinged or slidably mounted doors 17, which are apertured at 18, so as to clear the stationary rails when moved into closed position. Doors 17 may be provided with any desired type of operating mechanism and suitable sensors may be provided for the purpose of informing the elevator control system that the doors are in either their fully open or closed positions.

Figure 2:
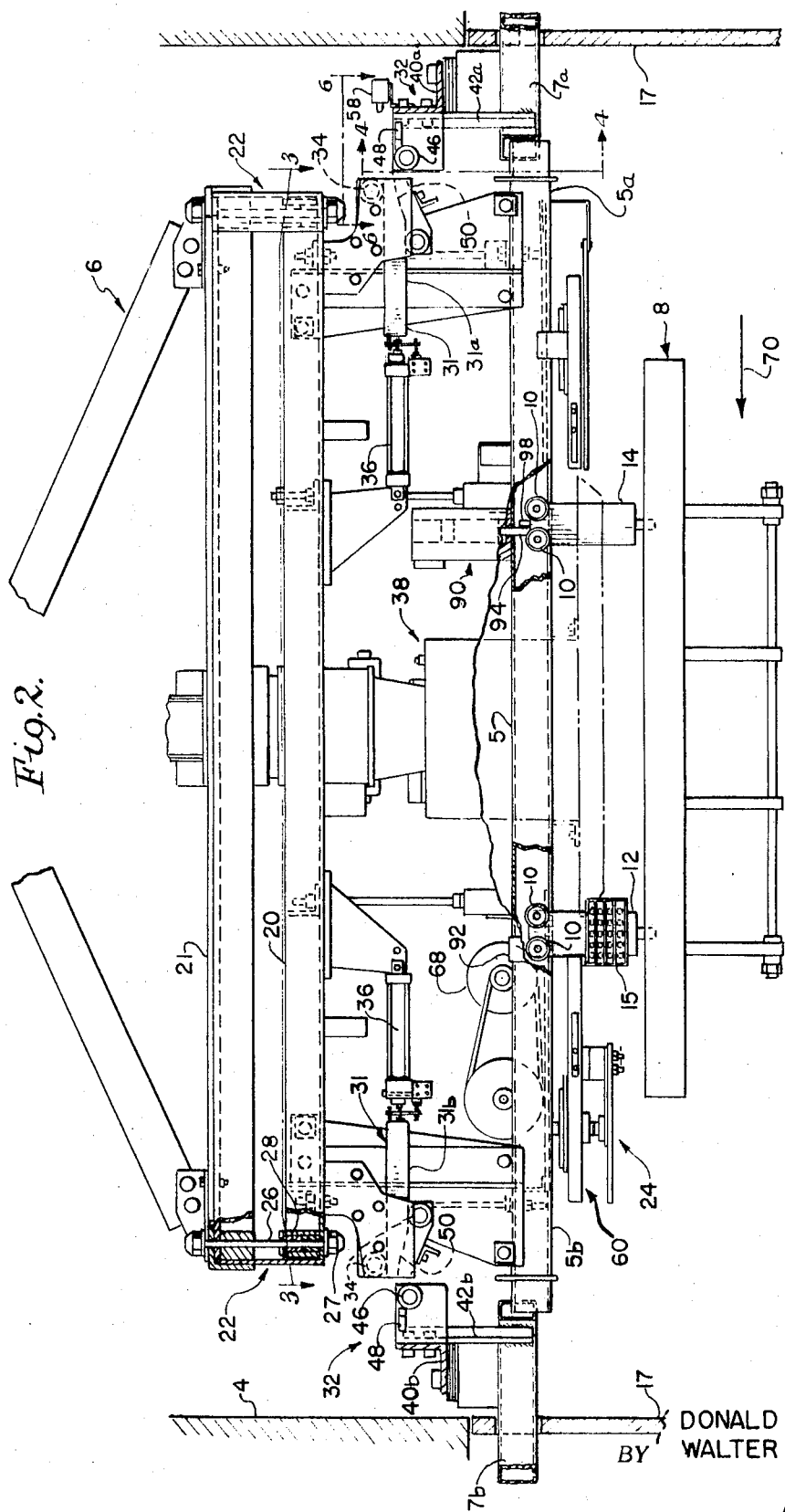
FIG. 2 is a side elevational view of an elevator car showing a cart transporting trolley in correct position for vertical travel.
Figure 3:
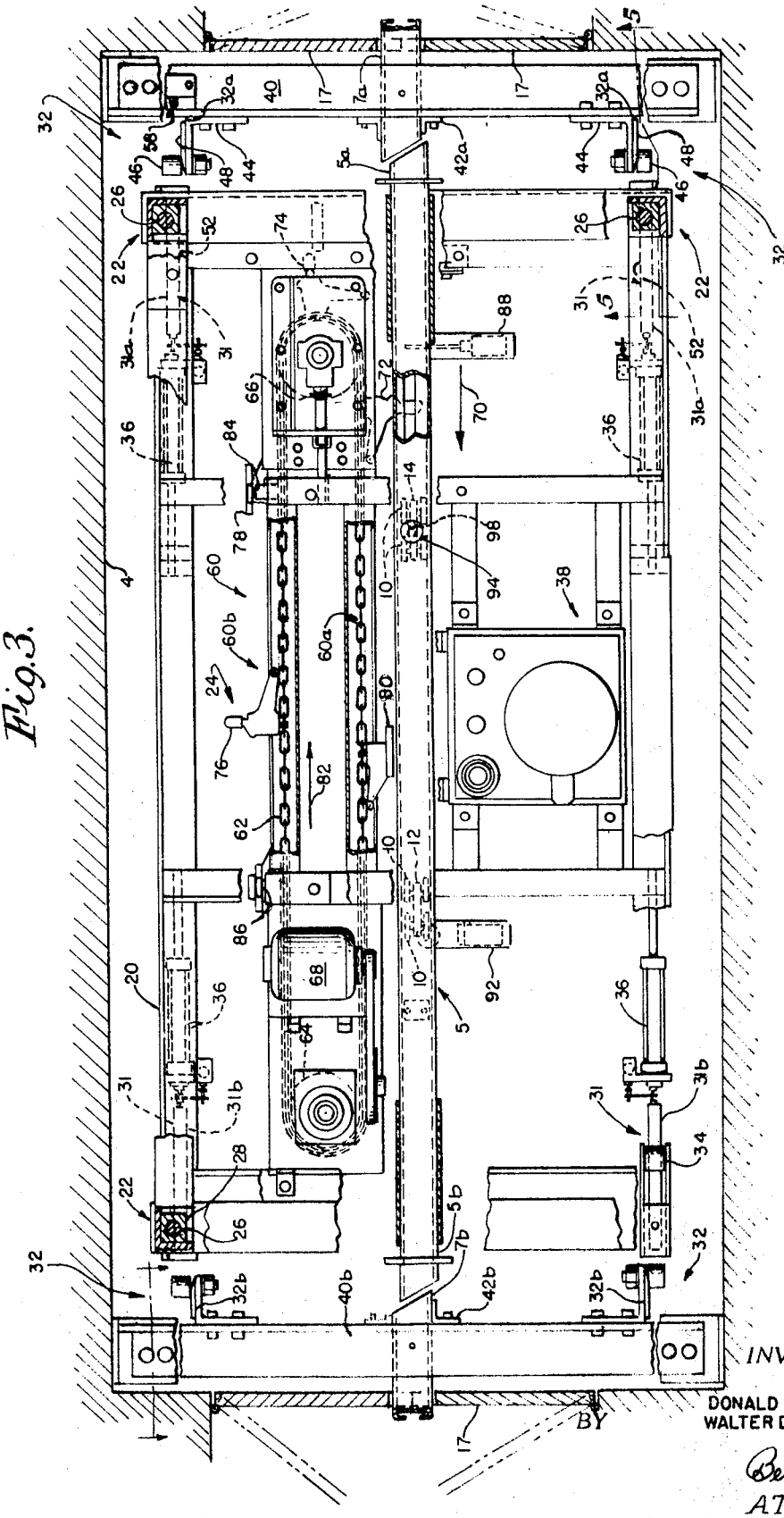
FIG. 3 is a sectional view taken generally along the line 3—3 in FIG. 2.

In accordance with the present invention, transfer mechanism 1 is adapted to adjustable position movable transfer rail 5 relative to elevator car 6 after the conventional elevator car leveling and vertical travel guide devices, not shown, have respectively served to approximately position the transfer rail in vertical and horizontal alignment with the stationary rails at a desired floor level, as indicated in FIGS. 2 and 3, in order to achieve accurate alignment of the mating ends of such rails, as shown in FIGS. 5 and 6. After the rails have been accurately aligned, the transfer mechanism is operable to transfer trolley 8 between the transfer and stationary rails. By assuring accurate alignment of the rails, in accordance with the present invention, it is possible to incline or overlap the mating ends of the rails, as indicated in FIGS. 3 and 6, without encountering the possibility that the transfer rail will hit against the stationary rails, as the elevator car is moved between floor levels. Overlapping of the mating ends of the rails is a particularly desirable feature, since it insures smooth transfer of trolley supporting rollers 10 between rails.

Now referring particularly to FIGS. 2 and 3, it will be seen that transfer mechanism 1 includes a platform 20, which is loosely suspended beneath the upper framework 21 of elevator car 6 by means of support devices 22 and in turn serves to support transfer rail 5 and a trolley transfer mechanism, generally designated at 24. Support devices 22 are provided one adjacent each corner of the elevator car and include framework mounted, vertically extending guide bolts 26, which are provided adjacent their lower ends with head enlargements 27 adapted to normally support platform 20 for vertical movement with the elevator car. Guide bolts 26 are freely received within platform-mounted bearing devices 28, such as to permit slight movement of the platform and, thus the transfer rail, relative to the elevator car framework in both vertical and horizontal directions.

In accordance with the preferred embodiment of the present invention accurate alignment of transfer rail 5 relative to the stationary rails at each floor level is effected by movable cam bars 31, which are carried one adjacent each corner of platform 20, and stationary cam devices 32, which are disposed at each floor level adjacent the path of travel of elevator car 6.

Referring to FIG. 3, it will be apparent that cam bars 31 are arranged as cooperating pairs 31a, 31b, which are disposed respectively in straddling relationship to the transfer rail adjacent inlet and outlet ends 5a, 5b thereof. Pairs of cam bars 31a, 31b are constrained, as by guide rollers 34, for extensible movement in opposite directions along paths of travel, which are disposed parallel to transfer rail 5 and transversely of the path of travel of elevator car 6. Cam bars 31 may be simultaneously reciprocated by any suitable means, such as platform-mounted hydraulic cylinders 36, which are each connected to a common platform-mounted hydraulic control system shown generally at 38 in FIGS. 2 and 3.

By referring to FIG. 3, it will also be apparent that cam devices 32, which are disposed at each floor level, are arranged in pairs 32a, 32b for cooperation with pairs of cam bars 31a, 31b, respectively. Cam devices 32a, 32b are mounted on angle iron supports 40a, 40b, which extend transversely of elevator shaft 4 and may be provided with brackets 42a, 42b for supporting the ends of input and output stationary rails 7a, 7b, respectively.

By referring to FIGS. 3 and 4, it will be apparent that pairs of cam devices 32a, 32b are of identical construction and the cam devices forming each pair are of mere image construction. Thus, it will be understood that, as best shown in the case of cam devices 31a, the cam devices of each pair include mounting flanges 44, guide rollers 46, which are journaled on flange portions 44 for free rotation about aligned horizontally disposed axes; and tapered cam guides 48. Guide rollers 46 and tapered cam guides 48, which are disposed on opposite facing surfaces of flanges 44, cooperate to define horizontally and vertically disposed guide surfaces engageable by the tapered lower surfaces 50 and facing vertically disposed side surfaces 52 of cam bars 31, respectively.

It will be understood that when the transportation system is originally set up, the elevator is adjusted such that the conventional elevator leveling equipment is adapted to place transfer rail 5 either in vertical alignment with or slightly below stationary rail 7 at each floor level, as indicated in full line in FIG. 2 and in phantom in FIG. 5; and such that the vertical travel guide devices of the elevator are adapted to place transfer rail 5 in either horizontal alignment with or slightly to one side of stationary rails 7, as indicated in full line in FIG. 3 and in phantom in FIG. 6. Thus, when cam bars 31a, 31b are extended by operation of cylinders 36, tapered lower surfaces 50 cooperate with rollers 46 when necessary to elevate platform 20 relative to elevator car 6, so as to vertically align transfer rail 5 with stationary rails 7. Simultaneous therewith or after initiation of the vertical aligning operation, facing surfaces 52 cooperate with tapered cams 48 to move platform 20 horizontally relative to elevator car 6, when necessary to horizontally align the rails. Also, it will be noted that engagement of tapered lower surfaces 50 with rollers 46 additionally serves to move platform 20 in a horizontal direction axially of transfer rail 5 whenever necessary to effect identical spacing between the inlet and outlet ends 5a, 5b of the transfer rail and stationary rails 7a, 7b.

Completion of the rail alignment operation may be sensed by one or more microswitches 58, which are engageable by associated cam bars 31 when the latter is in its fully extended position.

Trolley transfer mechanism 24 includes an endless conveyor 60 having an endless conveyor chain 62 trained about platform-mounted drive and idler sprockets 64, 66, respectively, so as to define front and rear conveyor flights 60a, 60b disposed substantially parallel to transfer rail 5, as best shown in FIG. 3. Drive sprocket 64 is drivingly coupled through a clutch, not shown, to platform mounted electric motor 68.

In a first embodiment of the mechanism 24, which is illustrated in FIGS. 2, 3, 7 and 8, trolley 8 is passed into and through elevator 6 in only one direction, as indicated by arrow 70. In this embodiment, conveyor chain 62 carries first, second and third pusher arms 72, 74 and 76, respectively; and first and second cam elements 78 and 80, respectively.

Figure 7:
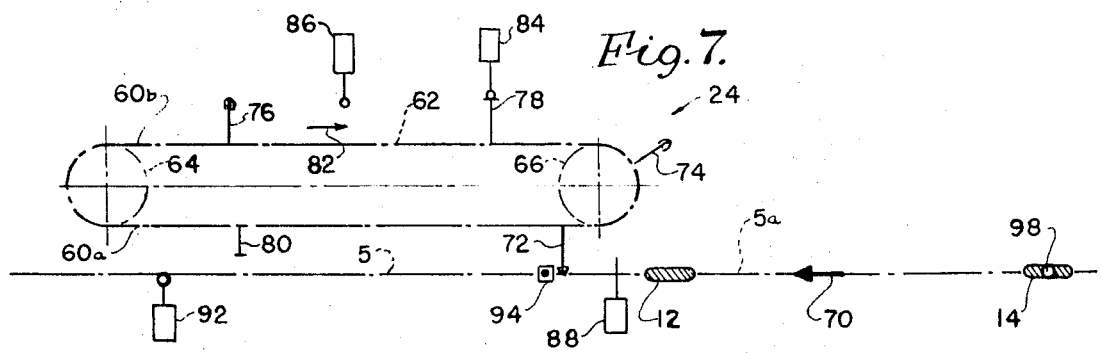
FIGS. 7 and 8 are diagrammatic views illustrating the sequence of operation of the elevator transfer mechanism of the present invention.
Figure 8:
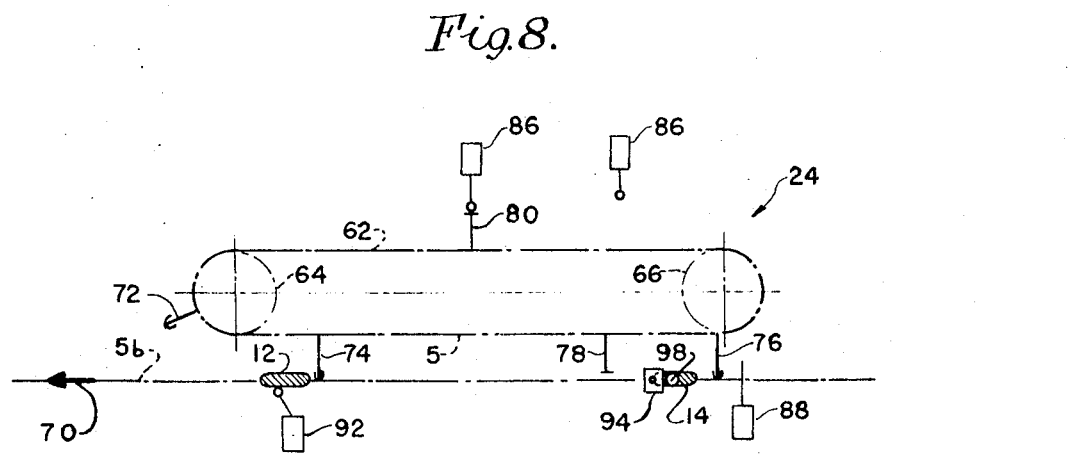

Upon driven rotation of sprocket 64, conveyor chain 62 is driven in the direction indicated by arrow 82, so as to successively position pusher arms 72-76 beneath transfer rail 5 and effect movement thereof from adjacent inlet and 5a towards outlet end 5b. During movement of conveyor chain 62, cam elements 78, 80 are adapted to be successively positioned in operable engagement, respectively, with receive and carry microswitches 84, 86, which are supported by platform 20 adjacent rear conveyor flight 60b. The arrangement of arms 72-76 and cam elements 78, 80 relative to microswitches 84, 86 and transfer rail 5 in trolley receiving and trolley carrying conditions of transfer mechanism 24 is shown in FIGS. 7 and 8, respectively.

Trolley transfer mechanism 24 is completed by the provision of a start transfer switch 88, a trolley stop device 90 and a load on car switch 92, which are placed in a spaced relationship along transfer rail 5. Trolley stop device 90 includes an electrically operated, stop pin 94, which is freely received for vertically reciprocating movement within aperture 96 of transfer rail 5. As will be more fully hereinafter described, stop pin 94, when extended downwardly within transfer rail 5, is engageable by projection 98 carried by trolley rear standard 14 for the purpose of arresting movement of the trolley relative to transfer rail 5.

To facilitate description of the operation of the present invention, reference is made to FIG. 12, which diagrammatically illustrates a transport system control 100 in association with a conventional elevator car controller 102. It will of course be understood that the specific construction of control arrangement 100 forms no part of the present invention, and that it may be modified from that illustrated depending upon the requirements of a given building installation.

Basically, however, control arrangement 100 preferably includes a master control 104, which is electrically connected to elevator car controller 102, as at 105, and a plurality of floor controls 106, which are arranged one at each floor level to be serviced and connected to master control 104, as at 108. Connected to control 106 at each floor level having both input and output rails 7a, 7b are preferably a trolley stop switch 110, an elevator car call switch 112, a trolley distinction readout device 114, a trolley feed on switch 116, a trolley entrance door switch 118, a trolley exit door switch 120, a trolley clear switch 122, and a clear zone switch 124. Both master control 104 and car controller 102 are connected to elevator car 6 via a traveling control cable 126 of a type similar to that employed in automatic passenger elevator cars to convey information with regard to floor selections.

In installations where elevator car travel is controlled by a car suspension or lifting cable and the elevator doors are solely under the control of control arrangement 100, it is only necessary to provide relatively few circuits through cable 126 between car controller 102 and car 6. Such circuits would include for instance a car lighting circuit and an operating circuit which would permit maintenance or inspection men riding on the car to control movement thereof.

It will be understood that car controller 102 and master control 104 are conveniently placed in an enclosure on the roof of the building being serviced. Preferably, a master control console 104', which permits monitoring and/or adjustment of the performance of master control 104 is placed at a more convenient location in the building.

For purposes of description, it will be assumed that elevator car 6 is empty, whereby transfer mechanism 24 is in its trolley receiving condition illustrated in FIG. 7, and that the elevator car is disposed at a floor level other than that at which trolley 8 is to be presented for loading. As the trolley to be loaded approaches elevator doors 17, it first engages stop switch 110, which arrests trolley movement in a position permitting car switch 112 to be actuated for purposes of calling the elevator car. When the elevator car arrives, car controller 102 signals master controller 104, which in turn signals transfer mechanism 1 to effect actuation of cam bars 31 for the purpose of aligning transfer rail 5 with stationary rails 7a, 7b. Upon movement of the cam bars to their fully extended position, microswitch 58 is actuated and in turn serves to notify master control 104, so that doors 17 may be opened. When doors 17 are in fully open position, trolley stop switch 110 is actuated to release trolley 8 and permit the latter to be fed as by means of gravity, from stationary rail 7a onto previously aligned c8 transfer rail 5. During trolley movement towards transfer rail 5, trolley encoder 15 is read by readout 114 and feed on switch 116 is actuated to indicate passage of the trolley and to flip or reset call switch 112 into operating condition for receipt of a subsequently presented trolley.

As trolley 8 moves on to transfer rail 5, trolley front standard 12 initially actuates start transfer switch 88, which is operable to energize drive motor 68 to set conveyor chain 62 in motion. In that the movement of conveyor chain 62 15, however, relatively slow relative to the movement of trolley 8, the latter is permitted to strike and be brought to rest by first pusher arm 72. Excessive jolting or damage to the conveyor or trolley, due to engagement of front standard 12 with arm 72, is prevented by permitting slippage of the clutch which couples drive sprocket 64 to motor 68.

Subsequently, second pusher arm 74 is moved up behind and into engagement with trolley front standard 12 and thereafter serves to push the trolley along transfer rail 5 into an approximately centered relationship relative to elevator car 6. At this point, motor 68 is deenergized by contact of cam 80 with carry or motor shutoff microswitch 86 and mechanism 24 placed in its carry condition shown in FIG. 8. Trolley 8 will continue to coast forward along transfer rail 5 until trolley rear standard mounted projection 98 comes to bear against extended trolley stop pin 94, whereupon trolley front standard 12 is brought into actuating engagement with load on car switch 92. Thereafter, trolley 8 is prevented from moving in either direction along transfer rail 5 by the cooperation of second pusher arm 74 and trolley stop pin 94 with front standard 12 and projection 98, respectively.

Master control 104 is notified of the actuation of load on car switch 92 with the result that doors 17 are closed and cam bars 31 subsequently retracted. Thereafter, car controller 102 is notified to move elevator car 6 to a new floor level determined by the previously sensed setting of encoder 15. Upon arrival of the trolley at the new floor level the rail alignment process described above is repeated and master control 104 effects opening of doors 17, retraction of trolley stop pin 94 from engagement with projection 94 and energization of drive motor 68. Upon energization of drive motor 68, trolley 8 is pushed off transfer rail 5 onto stationary rail 7b by engagement of third pusher arm 76 with rear trolley standard 14; the motion of conveyor chain 62 continuing until cam 78 engages receive or motor shutoff switch 84, which operates to again deenergize motor 68. Transfer mechanism 24 is now in its receive condition shown in FIG. 7 and ready to receive another trolley from a stationary rail 7a disposed at the same or another floor level.

It will be understood that opening of doors 17 at a new floor level will not be permitted if clear zone switch 124 senses the presence of a previously discharged trolley. In a like manner the outlet doors through which a trolley has been discharged will not be permitted to close if trolley clear switch 122 is not properly actuated. Preferably, suitable alarm devices would be provided at each floor level to notify personnel thereon of the presence of the above conditions so as to permit manual correction thereof, if necessary.

After the discharge of a trolley at a new floor level and the closing of doors 17, the elevator car may remain stationary until called to another floor level. Alternatively, control arrangement 100 may be designed, such that the elevator car will be automatically returned to a referenced floor level to await further call.

A second embodiment of the transfer mechanism, which is generally designated as 24' in FIGS. 9–11 has utility in systems wherein it is desired to both discharge trolleys onto and feed them from a single multipurpose or output rail 7b' at one or more floor levels; the trolley being fed onto and discharged from elevator car 6 at other floor levels as required along the straight line path indicated by arrow 70 in the manner discussed above with reference to FIGS. 7 and 8. In this embodiment a suitable powered conveyor, not shown, would preferably be provided in combination with each multipurpose output rail in order to feed or return gravity discharged trolleys to the elevator car. At other floor levels of the system, the trolley would be gravity fed both onto and from the transfer rail.

Mechanism 24' differs from mechanism 24 in the provision of additional first and second pusher arms 72', 74'; an additional cam element 80'; an additional start transfer switch 88; and an additional load on car switch 92'.

It will be understood by referring to FIGS. 9–11 that the positioning of arms 72', 74' and switches 88', 92' is opposite to that of arms 72, 74 and switches 88, 92, and that arms 72', 74', switches 88', 92' and cam element 80' are operable only when a trolley is to be fed onto transfer rail output end 5b, as indicated in FIG. 11, and when the thus loaded trolley is to be thereafter discharged from output end 5b at another floor level.

Specifically referring to FIG. 9, wherein mechanism 24' is shown as being in its normal receive condition, it will be seen that pusher arms 72, 74, 76; cam elements 78, 80; and switches 88, 92 occupy the same relative positions shown in FIG. 7 in the case of mechanism 24. Thus, at floor levels at which a trolley is to be fed onto input end 5a, as in FIG. 9, or the thus loaded trolley discharged from output end 5b of the transfer rail, as in FIG. 10, the operation of mechanism 24' is identical to that previously described with reference to mechanism 24.

The operation of mechanism 24', when the elevator car is to receive a trolley from multipurpose stationary rail 7b', will be best understood by referring specifically to FIGS. 9 and 11, and assuming that mechanism 24' is initially in its normal receive condition, shown in in FIG. 9. Thus, when the powered conveyor, not shown, which is associated with stationary rail 7b' is actuated, a trolley is fed onto transfer rail output end 5b. During such motion, trolley rear standard 14 initially engages start transfer switch 88, which is operable to energize the conveyor drive motor to set conveyor chain 62 in motion in a direction indicated by arrow 130. In that the movement of conveyor chain 62 is slow relative to the movement of trolley 8, the latter is permitted to strike and be brought to rest by first additional pusher arm 72'. As previously described with reference to mechanism 24, excessive jolting or damage to the conveyor or trolley due to engagement of rail standard 14 with arm 72' is prevented by permitting slippage of the clutch, which couples drive sprocket 64 to the conveyor drive motor.

Subsequently, additional second pusher arm 74' is brought up behind and into engagement with trolley rear standard 14 and thereafter serves to push the trolley along transfer rail 5 into an approximately centered relationship relative to the elevator car. At this point, the conveyor drive motor is deenergized by contact of cam 80' with motor shutoff switch 86 and mechanism 24' placed in its alternative carry condition shown in FIG. 11. The trolley will continue to coast towards the input end of transfer rail 5 until trolley rear standard mounted projection 98 comes to bear against extended trolley stop pin 94, whereupon trolley rear standard 14 is brought into actuating engagement with additional load on car switch 92'. Thereafter, the trolley is prevented from moving in either direction along the transfer rail by cooperation of pusher arm 74' with rear standard 14 and trolley stop pin 94 with projection 98, respectively.

After actuation of load on car switch 92' the elevator shaft doors are closed, the cam bars retracted and the elevator car automatically moved to a new floor level at which the trolley is to be discharged. Upon arriving at a new floor level, the rail alignment procedure is repeated, the elevator shaft doors opened and trolley stop pin 94 is automatically retracted from engagement with projection 98. The conveyor drive motor is also automatically started by the elevator control system and the trolley pushed off the output end 5b of the transfer rail by engagement of pusher arm 72' with rear standard 14; the motion of conveyor chain 62 continuing until cam element 78 engages receive or motor shut off switch 84. Transfer mechanism 24' is now in its receive condition shown in FIG. 9 and ready to receive another trolley from stationary rail 7a or multipurpose output rail 7b'.

It will be understood that the control arrangement previously described with reference to FIG. 12 may be readily modified as required to accommodate transfer mechanisms of the type illustrated in FIGS. 9–11.

We claim:

1. A mechanism for use in a system wherein a movable member carried by an elevator car for vertical movement therewith is to be placed in accurate alignment at least in a vertical direction with a stationary member disposed at a floor level to be serviced by said car, said car when stationary at said floor level serving to approximately place said movable member in vertical alignment with said stationary member, said mechanism comprising in combination:
    means to support said movable member on said car for movement therewith along a vertical path of travel, said support means being mounted to provide limited vertical movement of said movable member relative to said car when said car is stationary adjacent said floor level; and
    movable member aligning means, said aligning means including cam means vertically fixed relative to one of said movable and stationary members and stationary cam means vertically fixed relative to the other of said movable and stationary members, said cam means being extensible substantially transversely of said path of travel of said car into engagement with said stationary cam means when said elevator car is stationary at said floor level, whereby when said movable member is approximately aligned by said car, said cam and stationary cam means cooperate to move said movable member vertically of said car into accurate vertical alignment with said stationary member.

2. A mechanism according to claim 1, wherein said aligning means are arranged one adjacent each of four corners of said car, and said mechanism additionally includes means for substantially simultaneously extending said cam means into engagement with said stationary cam means.

3. A mechanism according to claim 1, wherein said cam means are fixed relative to said movable member for movement therewith along said path of travel of said car.

4. A mechanism according to claim 1, wherein said elevator car when stationary at said floor level serves to approximately place said members in horizontal alignment, and said cam and stationary cam means define generally horizontally and vertically disposed surfaces, said horizontally disposed surfaces cooperating to effect accurate vertical alignment of said members and said vertically disposed surfaces cooperating to effect accurate horizontal alignment of said members.

5. A mechanism according to claim 4, wherein said aligning means are arranged one adjacent each of four corners of said car, and said mechanism additionally includes means for substantially simultaneously extending said cam means into engagement with said stationary cam means, said extending means and said cam means are fixed relative to said movable member for movement therewith along said path of travel of said car.

6. A mechanism according to claim 1, wherein said aligning means are arranged one adjacent each of four corners of said car, each said cam means includes a bar member and means to mount said bar member for reciprocating movement tranversely of said path of travel between retracted and extended positions, said bar member having a vertically inclined cam surface disposed adjacent a free end thereof, each said stationary cam means includes a roller member and means to journal said roller member for free rotational movement about a horizontally disposed axis, said roller member being engageable by said cam surface when said bar member is reciprocated into said extended position, and said mechanism additionally includes means for substantially simultaneously reciprocating said bar members into said extended position thereof.

7. A mechanism according to claim 6, wherein said aligning means are arranged in cooperating pairs of aligning means, said stationary cam means of each said pairs includes a pair of horizontally spaced vertically extending cam surfaces, said pair of cam surfaces being engageable by an associated pair of said bar members when reciprocated into said extended position thereof, whereby said pairs of cam surfaces and associated pairs of bar members are adapted to effect accurate horizontal alignment of said movable and stationary members.

8. A mechanism according to claim 1, wherein said system is an overhead conveyor system including a trolley, said stationary member is a stationary conveyor rail for transporting said trolley at said floor level, and said movable member is a transfer conveyor rail for supporting said trolley for vertical movement with said car between floor levels, said transfer and stationary rails when accurately aligned permitting transfer of said trolley therebetween.

9. A mechanism according to claim 8, wherein said car when stationary at said floor level serves to approximately place said members in horizontal alignment, and said cam and stationary cam means define generally horizontally and vertically disposed surfaces, said horizontally disposed surfaces cooperating to effect accurate vertical alignment of said rails, and said vertically disposed surfaces cooperating to effect accurate horizontal alignment of said rails.

10. A mechanism according to claim 8, wherein said cam means are fixed relative to said transfer rail for movement therewith along said path of travel of said car.

11. A mechanism according to claim 8, wherein said support means includes platform means and means to suspend said platform means from said car for limited vertical movement relative thereto, said transfer rail and said cam means being supported on said platform means for movement therewith.

12. A mechanism according to claim 8, wherein said support means includes platform means and means to support said platform means for limited vertical movement relative to said car, said transfer rail being fixably supported on said platform means for movement therewith, and said mechanism additionally includes in combination means to transfer said trolley between said transfer and stationary rails, said transfer means being fixably supported on said platform for movement therewith.

13. A mechanism according to claim 12, wherein said aligning means are arranged one adjacent each of four corners of said car and platform means, each of said cam means includes a bar member and means to mount said bar member on said platform means reciprocating movement transversely of said path of travel between retracted and extended positions, said bar member having vertically inclined cam surface disposed adjacent a free end thereof, each said stationary cam means is fixed relative to said stationary conveyor rail and includes a roller member and means to journal said roller member for free rotational movement about a horizontally disposed axis, said roller member being engageable by said cam surface when said bar member is reciprocated into said extended position, and said mechanism additionally includes means mounted on said platform means for substantially simultaneously reciprocating said bar members into said extended position thereof.

14. A mechanism according to claim 13, wherein said platform supporting means permits limited horizontal movement of said platform means relative to said car, said aligning means are arranged in cooperating pairs of aligning means straddling said transfer rail, said stationary cam means of each said pairs including a pair of horizontally spaced, vertically extending cam surfaces, said pair of cam surfaces being engageable by an associated pair of said bar members when reciprocated into said extended position thereof, whereby said pairs of cam surfaces and said associated pairs of bar members are adapted to effect accurate horizontal alignment of said transfer and stationary rails.

15. A mechanism according to claim 12, wherein said transfer rail has input and output ends, said stationary conveyor rail arranged at said floor level being adapted to feed said trolley onto the inlet end of said transfer rail when said car is disposed at said floor level and at least another stationary conveyor rail is arranged at another floor level and adapted to receive said trolley from the outlet end of said transfer rail when said car is disposed at said other floor level, and said transfer means includes an endless conveyor, motor means to drive said endless conveyor in a given direction between a first trolley receiving condition and a second trolley carrying condition, said endless conveyor having means engageable with said trolley to move said trolley from adjacent said inlet end along said transfer rail into a predetermined trolley carry position when said motor is energized to drive said endless conveyor from said first to said second condition and to feed said trolley from said predetermined position off of said transfer rail and onto said other stationary rail when said motor is energized to drive said endless conveyor from said second to said first condition, means to control energization of said motor, and means carried by said platform for cooperation with said engaging means to removably lock said trolley in said predetermined position during movement of said car from said floor level to said other floor level.

16. A mechanism according to claim 15, wherein said other stationary rail is additionally adapted to feed said trolley onto the outlet end of said transfer rail, a second stationary rail is arranged at a second floor level and adapted to receive said trolley from the output end of said transfer rail when said car is disposed at said second floor level, said motor means is adapted to drive said endless conveyor in a direction opposite to said given direction between said first condition and a third condition and in said given direction between said third condition and said first condition, said endless conveyor includes additional means engageable with said trolley to move said trolley fed by said other stationary rail from adjacent said outlet end to a second predetermined trolley carry position when said motor is energized to drive said endless conveyor from said first to said third condition and to feed said trolly from said second predetermined trolley carry position onto said second stationary rail when said motor is energized to drive said endless conveyor from said third condition to said first condition and said platform carried means additionally cooperates with said additional engaging means to removably lock said trolley in said second predetermined position during movement of said car from said other floor level to said second floor level.